June 29, 1926.  J. WALDHEIM  1,590,658

TYPEWRITING MACHINE

Filed August 21, 1924    3 Sheets-Sheet 1

Inventor:
John Waldheim
by B.C. Stickney
Attorney.

June 29, 1926.
J. WALDHEIM
1,590,658
TYPEWRITING MACHINE
Filed August 21, 1924  3 Sheets-Sheet 2
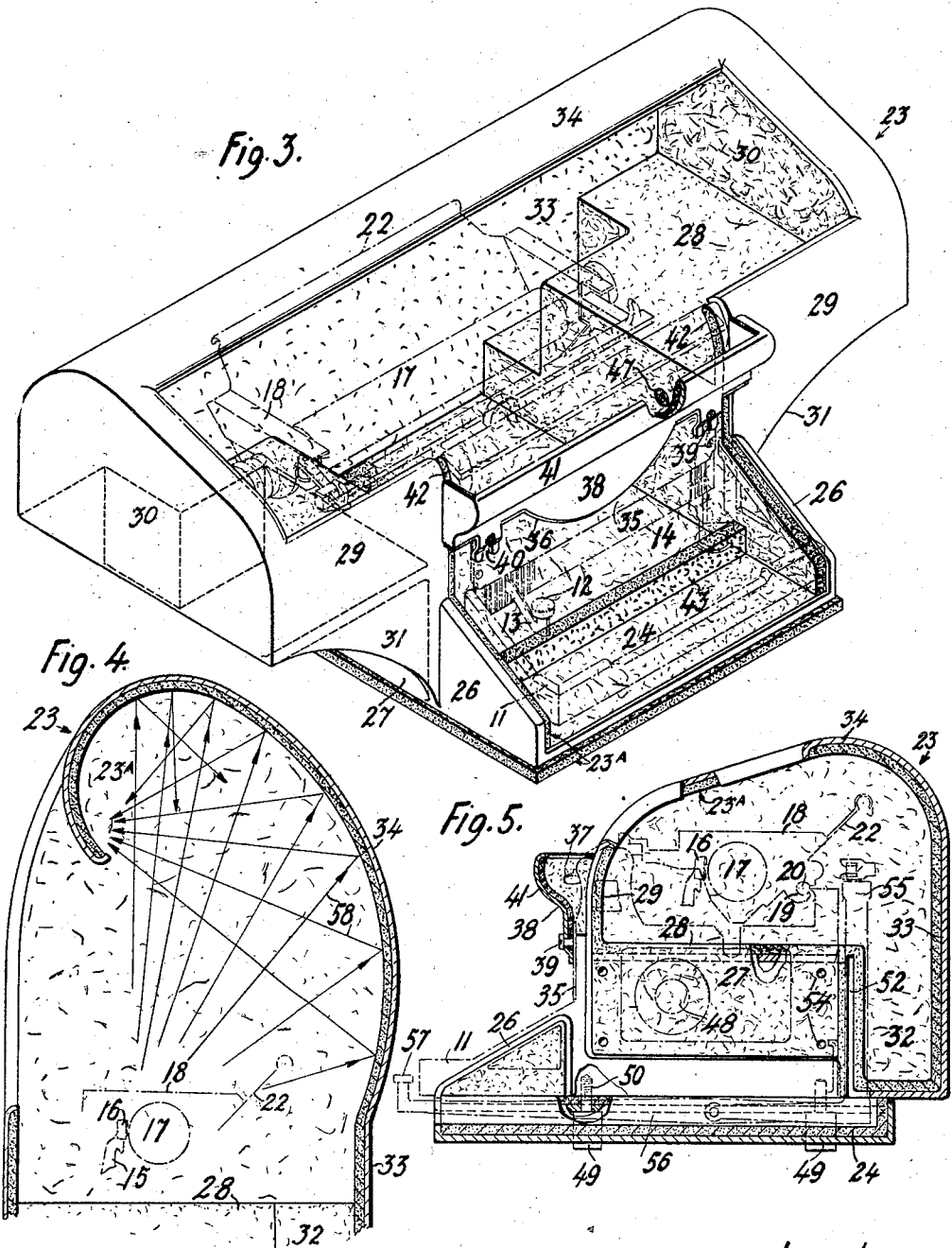
Inventor:
John Waldheim
by B.C. Stickney
Attorney.

June 29, 1926.
J. WALDHEIM
TYPEWRITING MACHINE
Filed August 21, 1924  3 Sheets-Sheet 3
1,590,658
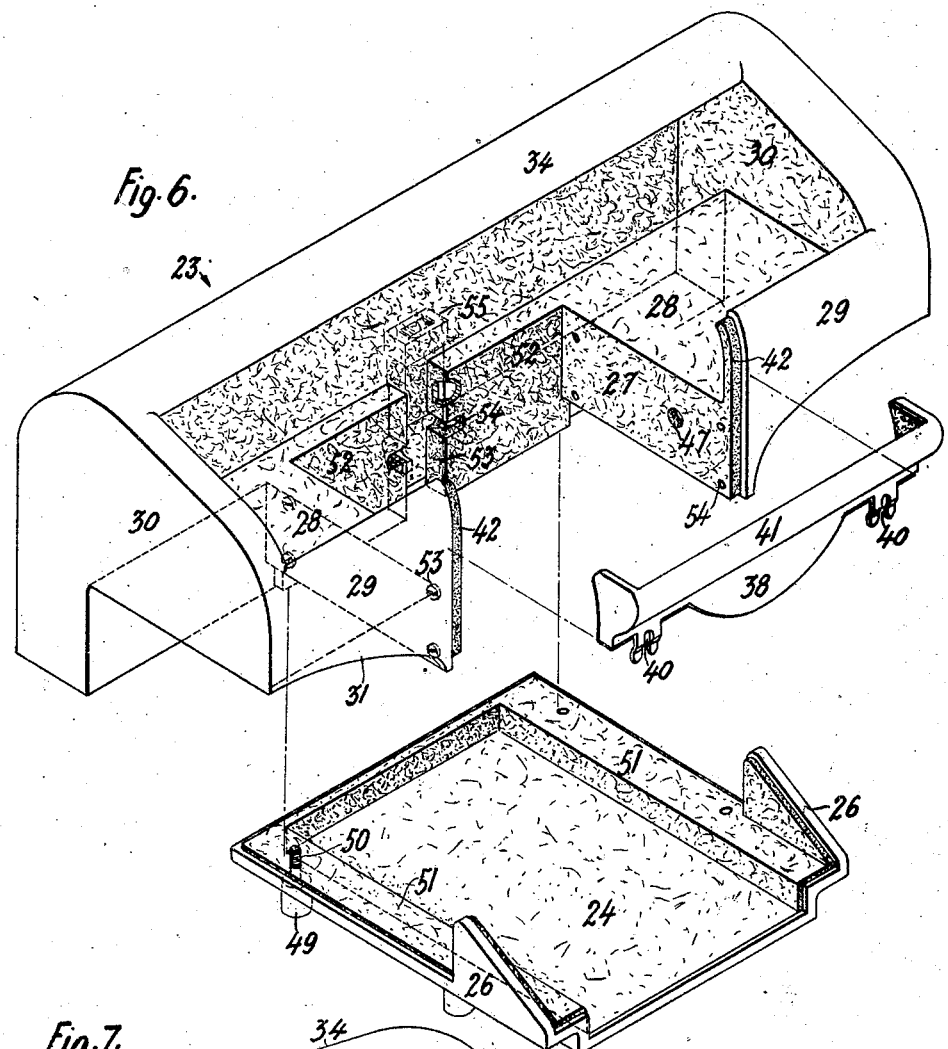
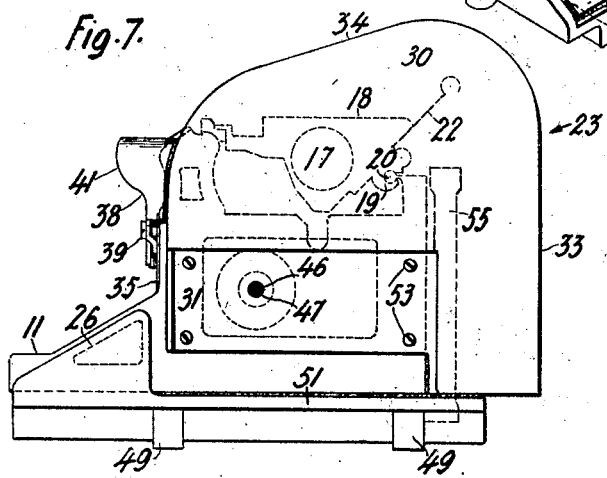
Inventor:
John Waldheim
by D C Stickney
Attorney.

Patented June 29, 1926.

1,590,658

UNITED STATES PATENT OFFICE.

JOHN WALDHEIM, OF ELIZABETH, NEW JERSEY, ASSIGNOR TO UNDERWOOD TYPEWRITER COMPANY, OF NEW YORK, N. Y., A CORPORATION OF DELAWARE.

TYPEWRITING MACHINE.

Application filed August 21, 1924. Serial No. 733,286.

This invention relates to sound-deadening cabinets for typewriting machines. There is on the market the well-known Underwood sound-deadening appliance, shown in the application of C. B. Corcoran, No. 604,468, filed December 2, 1922 (now Patent No. 1,509,828, dated September 30, 1924), which appliance is in the form of a pack, boxwork or shoe to fit around the frame of the machine, and which is lined with felt to absorb the sound-waves emanating from the machine.

The present invention is in the nature of an improvement on the device disclosed in the above-mentioned application, and an object is to produce a more efficient sound-deadening casing by enclosing more of the machine and still giving free access to the paper-carriage. To this end, the invention comprises a box-like portion to fit around the frame of the machine to hug it tightly to hold it on the machine. The rear wall of said box extends upwardly and curves forwardly over the carriage to form a canopy, to thus completely prevent the escape of sound at the rear of the machine and partly at the top of the machine. To further prevent the escape of sound at the sides of the machine, upper side walls are provided, which are located a considerable distance beyond the side walls of the box-like section, so as to provide clearance for the back-and-forth movement of the typewriter carriage. The rear wall and the front walls extend laterally to the offset upper side walls to provide further closures. Thus, there is produced a sound-deadening cabinet, which, although it does not subdue all of the sound, prevents the escape of sound to a very large degree. By so forming the casing with the lower side walls close to the machine frame, while the upper side walls are offset with respect thereto, the opening in the front of the casing, to give access to the carriage, is reduced to a minimum, so as to reduce the escape of sound from said casing to a minimum.

The front of the box-like portion of the casing is open and forms a T-shaped opening with the elongated opening in the upper part of the casing, so that the machine may be readily set into the casing irrespective of the position of said carriage.

The casing or sound-deadening pack is in the nature of a sheet-metal or die-cast casing, forming substantially a complete enclosure with the exceptions above noted, and is heavily lined throughout with soft, sound-absorbing felt or the like, in a manner to offer extensive areas of felt to the action of the sound waves or vibrations all around and under and over the typewriter, whereby said waves are caught and weakened or absorbed, and the noise of operation substantially reduced. There is effected reduction in the sound that emanates from the extensive paper-and-carriage-handling opening in the top part of the casing, this reduction being due to the sound-absorbing qualities of the pack, so that the operator is less annoyed and distracted than where prior forms of sound-deadening packs are used. The improved pack, by reason of being continued upward and partly over the top of the carriage, and upward at the sides to enhood the carriage as much as practicable, not only substantially increases the area of the sound-absorbing lining that receives and deadens the sound vibrations, but also screens the noise from escaping from the back and sides of the machine, thus relieving from distraction others who may be stationed at the rear or sides of the typist's desk; the device therefore having the nature of a sound-pack at its lower boxwork framework-enclosing portion, and a sound-screen at its upper boxwork or carriage-enclosing portion; both the pack and the screen being efficient sound-absorbers.

The improved device is distinguished from sound-proof cabinets, which completely enclose the carriage and have windows through which the work is visible and a hinge connection to permit the lifting of the cover to gain access to the work, in that the carriage-enclosing cover is unitary (preferably integral), with the base portion of the sound-pack, and does not need to be swung up to reach the work, inasmuch as it is open.

The bottom boxwork comprises a floor or sole which may be first screwed onto the bottom of the typewriter framework; and the remainder of the pack may comprise front and rear walls, with top, which may be attached tightly to the sides, front and rear of the typewriter framework.

The rear of the pack may be formed with a pocket in which may hang the work-sheets pendent from the carriage, and this pocket may be lined throughout with heavy felt, to augment the sound-absorbing qualities of the pack.

In one form of the invention, the top or roof of the device may in cross-section be given a form resembling a parabola, whereby sound-waves, rising in various backward directions from the type-striking region, may be caught by certain portions of the parabola and reflected to other portions of the parabola, and also down into the body of the pack, whereby the time may be prolonged during which the sound is imprisoned and gradually weakened within the pack.

Other features and advantages will hereinafter appear.

In the accompanying drawings,

Figure 3 is a perspective view of the invention shown in Figure 1, parts being broken away.

Figure 4 is a fragmentary sectional view showing a modified form of the present invention.

Figure 5 is a cross-sectional view of another modification of the present invention applied to a typewriter.

Figure 6 is a spread perspective view of the modification of the invention shown in Figure 5, parts being broken away.

Figure 7 is a side elevation of the invention shown in Figure 5.

Figure 2:
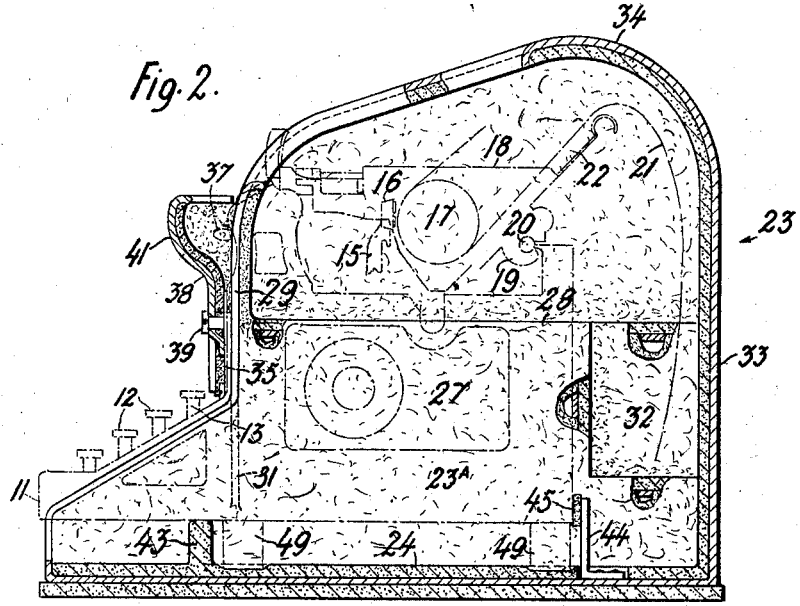
Figure 2 is a cross-sectional view taken on the plane indicated by the line 2—2 of Figure 1 and looking in the direction of the arrows.

The Underwood standard typewriting machine comprises a main frame 10 having rear and side walls and posts at each corner of the frame. A keyboard extension 11 extends forwardly of the main frame, in which extension are disposed banks of keys 12 carried by key-levers 13 operating in a guide or comb-plate 14. These key-levers 13 are connected to operate type-bars 15 carrying type 16 to strike a platen 17 carried in a platen-frame 18. Said platen-frame 18 is supported on a carriage 19 mounted for lateral movement upon the front rail (not shown) and a rear rail 20. Said platen 17 supports a work-sheet 21 which passes over a rear table 22.

The machine illustrated has openings at its top and bottom, and openings in the front, rear and side walls of main frame 10. The operation of the ordinary typewriter produces considerable noise, which escapes through these openings and is objectionable. It is desirable to limit as much of this noise as possible. This is accomplished in the present invention by placing the machine in a casing, indicated generally at 23, which encloses substantially the entire machine leaving only a sufficient opening at the top to insert and adjust the work-sheet 21, and only a sufficient opening at the front to permit the insertion of the machine in said casing and to permit the operation of said machine. This casing 23 is formed of a single piece of sheet-metal or die-casting and is lined with thick sound-deadening material, such as soft felt 23$^a$.

Figure 1:
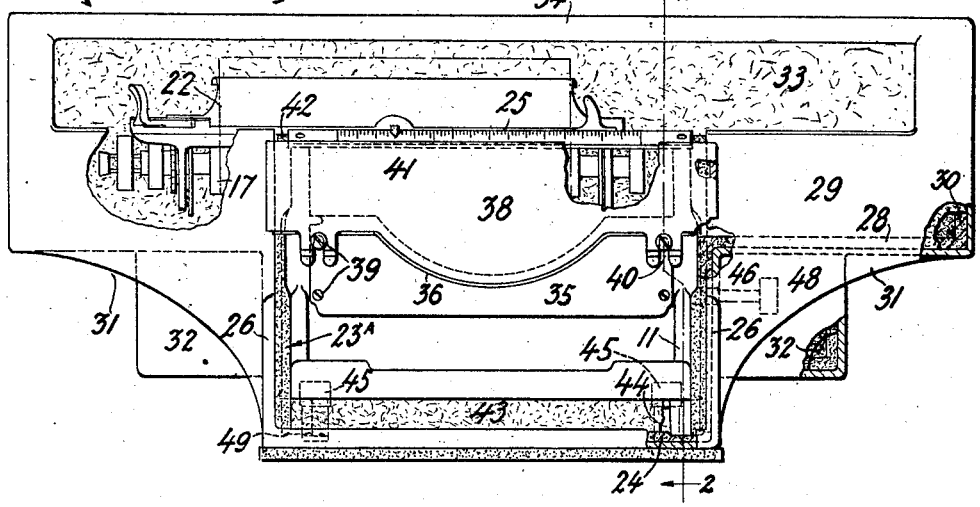
Figure 1 is a front elevation of a typewriter with one form of the present invention applied thereto, parts being broken away.

Referring to Figures 1, 2 and 3, the casing 23 is provided with a bottom portion or sole 24 extending from the extreme end of the keyboard extension 11 to a point beyond the rear of the machine. The supporting feet 49 of the machine rest on said sole 24 when the machine is in the casing.

Formed on each side of said sole 24, at its front end, are upstanding flanges 26 shaped to conform to the shape of the side walls of the keyboard extension 11 and disposed to engage said side walls snugly for closing the openings therein.

In order to close the openings in the sides of the machine, the casing 23 is provided with side walls 27 extending upwardly to the top of the machine frame. Said side walls 27 are in alignment with the upstanding flange portions 26 on the sole 24. These side walls 27 are composed of heavy resilient felt to snugly engage the corresponding side walls of the machine and prevent the escape of noise at these points, and clamp the casing on the machine.

Extending from the top of said side walls to each side thereof are lateral extensions in which the carriage 19 may move from side to side. Said lateral extensions comprise horizontal portions 28, front walls 29 and end walls 30, said front walls 29 and end walls 30 extending upwardly to substantially the top of the machine. In order to support these lateral extensions and afford a balanced structure, brackets 31 connecting the side walls 27 and the front walls 29 are provided.

It is a feature of this invention to provide means for permitting the work-sheet 21 to travel freely from side to side inside the casing. This is accomplished by providing a pocket 32 at the rear of said casing 23. This pocket 32 is closed except at the top and extends from the extreme point of movement of the carriage 19 on one side to the extreme point of movement of said carriage 19 on the other side of the machine. The rear wall 33 forming the rear wall of the casing 23 closes the pocket 32 at the rear. Said rear wall 33 extends upwardly above the machine and forwardly to form a cover or top portion 34. As will be noted from Figure 2, said top portion 34 extends forwardly to a point substantially on a line with the middle of the rear table 22. Sufficient space is allowed between the cover 34 and the machine to permit the operator to insert or adjust the work-sheet 21.

As will be seen from Figure 3, the key-levers 13 extend through the guide-plate 14. Mounted on all Underwood standard machines, above said guide-plate 14, is a plate 35, said plate 35 having a semicircular top edge 36. Secured on the front of said machine adjacent its top, is a scale 25 on which slides margin guides operated by a handle 37. Between said plate 35 and the scale 25 is an opening in the machine to permit access to the type and inner mechanism. This opening is closed by a plate 38. Said plate 38 is mounted directly on the frame of the machine by means of the upper set of screws 39 used to fasten plate 35 onto the machine, said screws 39 having shanks long enough to permit them to pass through the slots 40 on plate 38 and the aligned openings in plate 35 on the machine frame. By reason of this construction, plate 38 may be readily detached. Said plate 38 has a curved portion 41 which permits the operator to grasp the handle 37 of the margin guides for moving said guides, and is provided with shoulder portions which are disposed to engage the shoulder portions 42 of the front wall 29 of the lateral extensions in order to completely close the opening at these points and also to stiffen the casing.

Below said guide-plate 14 is an opening through which noise may escape. To close said opening, the sole 24 has formed thereon an upstanding flange portion 43 (see Figure 2) extending upwardly to said plate 14 and entirely across the said sole 24.

To position the machine in the casing 23, brackets 44 carrying pads 45 are mounted in said sole 24 at each side thereof.

In order to operate the ribbon mechanism from the exterior of the casing 23, a shaft 46 protrudes through an opening 47 in one of the side walls 27, which shaft 46 is operatively connected to a transverse ribbon shaft on the inside of said machine and is provided with a knurled wheel 48 for operating the same.

The casing 23 and the plate 38 are lined with any suitable noise-deadening material, such as soft felt.

In the casing shown in Figures 5, 6 and 7, the sole 24 and the upstanding flanges 26 form a single unit, which unit is mounted directly onto the bottom of the machine by supporting it on feet 49, similar to the usual typewriter supporting feet, by means of screws 50 which extend upwardly through said feet 49 and into the usual corner posts of the machine frame. The bottom of the machine frame rests directly on the flange portions 51 formed on said sole 24. As will be understood, both the machine and sole 24 are supported on said feet 49.

The casing shown in these views is provided with a rear wall 52 which snugly engages the rear of the machine frame and closes the opening at that point. Said rear wall 52 has an opening 53 and grooves 54 for the reception of a tabulating housing 55 and associated parts which are carried on the rear of some typewriters. It will be noted from Figure 6 that the sole 24 has no upstanding flange extending across its front portion.

This flange is omitted to permit the operation of the tabulating levers 56, supporting the tabulating keys 57, which levers 56 extend from the front to the rear of said machine below its frame, and raise the plungers in the tabulating housing 55.

It will also be noted that on the front of the machine the pocket 32 extends from the extreme end of one lateral extension to the extreme end of the other lateral extension, the rear wall 52 serving as the front wall of said pocket 32, and the base of said pocket 32 resting on the sole 24.

Referring to Figure 4, the form of invention, shown in this view, is substantially similar to that shown in Figures 1, 2 and 3, except that the cover portion 34, which forms an extension of rear wall 33 of the pocket 32, extends considerably higher than the cover shown in Figures 1, 2 and 3. Also said cover 34, as illustrated in Figure 4, extends forwardly to a point on a plane with the front of the machine and downwardly and rearwardly to a point on a plane with the front of the platen 17. By reason of this construction the operator is permitted to insert the work-sheet 21 into the machine or adjust the same, and the escape of noise is confined to the front of the machine as will be apparent from the directions taken by the noise waves as indicated by the arrows 58.

In the preferred form of the invention, there is embodied in a single piece or element a pack for the typewriting machine frame, said pack comprising side walls 27 and rear wall 52, and a chamber for the typewriter carriage, said chamber comprising floors 28, ends 30, top 34, back 33, and front 29, an opening affording access to the carriage, and its appurtenances being formed in the upper portion and front of the top and extending substantially the entire length thereof, and merging into the front opening between the side walls 27 of the pack; the sheet-receiving pocket opening into said carriage chamber at the rear, and all of said parts being lined with sound-deadening material. This single-piece element can be packed snugly onto the typewriting machine, whereby most of the sound vibrations are dampened and absorbed; and there may be added the front plate 38 covering the type-bar opening in the front of the machine frame, and at its upper portion jutting forwardly at 41 to afford access to the settable margin gages. The carriage-returning handle projects through the opening in the top of the carriage-chamber, to the exterior of the pack, and the opening in the top is commodious for convenience in adjusting the sheets in the carriage.

Variations may be resorted to within the scope of the invention, and portions of the improvements may be used without others.

Having thus described my invention, I claim:

1. A sound-deadening pack for a typewriting machine, comprising a lower boxwork having a sound-absorbing lining and fitting tightly upon the framework of the typewriting machine, and surmounted by a carriage-chamber unitary with said lower boxwork and having bottom, ends, front, back and top all provided with sound-absorbing linings, said chamber open throughout its length at its top and front to afford access to the typewriter carriage and its appurtenances for manipulation thereof.

2. A sound-deadening pack for a typewriting machine, comprising a lower boxwork having a sound-absorbing lining and fitting tightly upon the framework of the typewriting machine, and surmounted by a carriage-chamber unitary with said lower boxwork and having bottom, ends, front, back and top all provided with sound-absorbing linings, said chamber open throughout its length at its top and front to afford access to the typewriter carriage and its appurtenances for manipulation thereof, said lower boxwork comprising side and rear walls, and a separate sole or flooring lined with sound-absorbing material and fitted to the typewriting machine base and to said walls.

3. A sound-deadening pack for a typewriting machine, comprising a lower boxwork having a sound-absorbing lining and fitting tightly upon the framework of the typewriting machine, and surmounted by a carriage-chamber unitary with said lower boxwork and having bottom, ends, front, back and top all provided with sound-absorbing linings, said chamber open throughout its length at its top and front to afford access to the typewriter carriage and its appurtenances for manipulation thereof, said pack also comprising a front plate having securing means and lined with sound-absorbing material, and at its lower portion covering the typebar opening in the typewriter framework, and at its upper portion jutting forwardly from the machine to afford access to the settable margin-gages.

4. A sound-deadening pack for a typewriting machine, comprising a lower boxwork having a sound-absorbing lining and fitting tightly upon the framework of the typewriting machine, and surmounted by a carriage-chamber unitary with said lower boxwork and having bottom, ends, front, back and top all provided with sound-absorbing linings, said chamber open throughout its length at its top and front to afford access to the typewriter carriage and its appurtenances for manipulation thereof, said lower boxwork comprising side and rear walls, and a separate sole or flooring lined with sound-absorbing material and fitted to the typewriting machine base and to said walls, said sole extending forwardly beneath the typewriter keyboard and at its front portion having upturned flanges lined with sound-absorbing material and tightly fitting to the sides of the keyboard portion of the typewriter framework.

5. A sound-deadening pack for a typewriting machine, comprising a lower boxwork having a sound-absorbing lining and fitting tightly upon the framework of the typewriting machine, and surmounted by a carriage-chamber unitary with said lower boxwork and having bottom, ends, front, back and top all provided with sound-absorbing linings, said chamber open throughout its length at its top and front to afford access to the typewriter carriage and its appurtenances for manipulation thereof, and a pocket lined with sound-absorbing material and extending the length of said chamber and opening at its upper end thereinto and closed at its lower end, said pocket receiving the ends of work-sheets pendent from the rear of said carriage, said boxwork comprising a rear wall which forms the front wall of said pocket.

6. A sound-deadening pack for a typewriting machine, comprising a lower boxwork having a sound-absorbing lining and fitting tightly upon the framework of the typewriting machine, and surmounted by a carriage-chamber unitary with said lower boxwork and having bottom, ends, front, back and top all provided with sound-absorbing linings, said chamber open throughout its length at its top and front to afford access to the typewriter carriage and its appurtenances for manipulation thereof, and a pocket lined with sound-absorbing material and extending the length of said chamber and opening at its upper end thereinto and closed at its lower end, said pocket receiving the ends of work-sheets pendent from the rear of said carriage, said boxwork comprising a rear wall which forms the front wall of said pocket, said boxwork open at its front and having side and rear walls, and also having a sole of sound-absorbing material; the front opening in said boxwork merging with the opening in the front and top of said carriage-chamber.

7. A sound-deadening pack for a typewriting machine, comprising a lower boxwork having a sound-absorbing lining and fitting tightly upon the framework of the typewriting machine, and surmounted by a carriage-chamber unitary with said lower boxwork and having bottom, ends, front, back and top all provided with sound-absorbing linings, said chamber open throughout its length at its top and front to afford access to the typewriter carriage and its appurtenances for manipulation thereof, a pocket lined with sound-absorbing material and extending the length of said chamber and opening at its upper end thereinto, and closed at its lower end, said pocket receiving the ends of work-sheets pendent from the rear of said carriage, said boxwork comprising a rear wall which forms the front wall of said pocket, said boxwork open at its front and having side and rear walls, and also having a sole of sound-absorbing material; the front opening in said boxwork merging with the opening in the front and top of said carriage-chamber, and a plate extending across the front of the typewriting machine framework and lined with sound-deadening material, and covering the type-bar opening in the front of the typewriter framework and formed at its upper portion to afford space for access through the open front of said boxwork to the settable margin-gages.

8. A sound-deadening pack for a typewriting machine, comprising a lower boxwork having a sound-absorbing lining and fitting tightly upon the framework of the typewriting machine, and surmounted by a carriage-chamber unitary with said lower boxwork and having bottom, ends, front, back and top all provided with sound-absorbing linings, said chamber open throughout its length at its top and front to afford access to the typewriter carriage and its appurtenances for manipulation thereof, said top extending upwardly, forwardly and downwardly from the rear of the pack in a curve resembling a parabola.

9. A sound-deadening pack for a typewriting machine, said machine including a keyboard extension into which a plurality of key-levers extend, a guide-comb through which said key-levers extend, said machine having an opening in its bottom, and an opening in its front below said guide-comb, said pack comprising a sound-deadening sole disposed to engage the bottom of said machine for closing the bottom opening therein, upstanding flanges formed on the sides of said sole adjacent its front and lined with sound-deadening material for dampening said keyboard extension, and means comprising an upstanding flange formed on said sole extending from side to side thereof and faced with sound-deadening material for closing the opening in the front of said machine below the guide-comb.

10. A sound-deadening pack for a typewriting machine, said machine including a main frame, a carriage movable sidewise thereof, and a keyboard extension having side walls, said pack comprising sound-deadening side walls and a sound-deadening bottom portion or sole, said pack walls snugly engaging said main frame, and said sole snugly engaging the bottom of the machine, lateral extensions lined with sound-deadening material and forming a chamber in which said carriage is disposed to travel, said chamber open at its front, forward sound-deadening extensions snugly engaging the side walls of the keyboard extension, and a sound-deadening pocket to receive the overhanging end of a work-sheet, all of said parts of said pack forming a unitary structure.

11. A sound-deadening pack for a typewriting machine, said machine comprising a frame having rear and side walls, said frame having openings in said rear and side walls and an opening at its bottom, and a housing for tabulating levers carried on said rear wall, said pack having sound-deadening rear and side walls closing the openings in the rear and side walls of said machine, and a sole closing the opening at the bottom of said frame, the rear wall of said pack having an opening to receive said housing.

12. A sound-deadening casing for a typewriting machine, said machine including a traveling carriage, a platen for holding a work-sheet mounted on said carriage, said machine having openings at its top, bottom, rear and sides, said casing comprising a sole for closing the bottom opening in said machine, said sole mounted directly onto the machine, rear and side walls, for completely closing the openings in the rear and sides, lateral extensions in which said carriage is disposed to travel, a cover for partly closing the opening at the top, said rear and side walls, lateral extensions and cover forming a unitary structure mounted directly onto the machine, and a device for receiving the overhanging end of said work-sheet, to protect it while traveling with said carriage, said device comprising a pocket including front, rear and side walls and a floor extending from the extreme outer end of one lateral extension to the extreme outer end of the other lateral extension, said rear and side walls, lateral extensions, cover and pocket all forming a unitary structure mounted directly onto the machine.

13. A sound-deadening pack for a typewriting machine, said machine having openings at its bottom, top, front, rear and sides, said pack comprising a sole for closing said bottom opening, and rear and side walls for closing said rear and side openings, said rear wall extending upwardly to form an elongated curved cover and extending downwardly and forwardly to a point on a line with the front of the machine for closing said top opening and confining the sound-waves except those escaping forwardly of the machine, all the parts of said pack forming a unitary structure.

14. In a sound-deadening casing for a typewriting machine, said machine having openings at its bottom, top, front, rear and sides, said casing comprising a sole for closing said bottom opening, and rear and side walls for closing said rear and side openings, said rear wall forming an elongated curved cover extending upwardly and forwardly to a point on a line with the front of the machine, and downwardly and rearwardly to a point on a line with the front of the platen, sufficient space being allowed to insert the work-sheet under said cover, all the parts of said casing forming a unitary structure.

15. A sound-muffling casing for a typewriting machine comprising an open front and an open top to fit around the main frame of the machine, and a rear wall extending upwardly and forwardly over the carriage, said rear wall extending the full length of the travel of said carriage.

16. A sound-muffling device for a typewriting machine, comprising an open front and an open top to fit around the main frame of the machine, a rear wall extending upwardly and forwardly over the carriage, said rear wall extending the full length of the travel of said carriage, and pockets for the overhanging edge of a work-sheet, said pockets arranged in front of said rear wall.

JOHN WALDHEIM.